United States Patent
Kataoka

(10) Patent No.: US 10,773,656 B2
(45) Date of Patent: Sep. 15, 2020

(54) SURROUNDING CIRCUMSTANCE MONITORING APPARATUS

(71) Applicant: TOYOTA JIDOSHA KABUSHIKI KAISHA, Toyota-shi, Aichi-ken (JP)

(72) Inventor: Yusuke Kataoka, Yokohama (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 281 days.

(21) Appl. No.: 15/848,232

(22) Filed: Dec. 20, 2017

(65) Prior Publication Data

US 2018/0215324 A1  Aug. 2, 2018

(30) Foreign Application Priority Data

Jan. 31, 2017 (JP) ................. 2017-015232

(51) Int. Cl.
*B60R 11/00* (2006.01)
*G01S 7/481* (2006.01)
*B60R 19/48* (2006.01)
*G01S 17/931* (2020.01)

(52) U.S. Cl.
CPC ............ *B60R 11/00* (2013.01); *B60R 19/483* (2013.01); *G01S 7/4813* (2013.01); *G01S 17/931* (2020.01); *B60R 2011/0019* (2013.01); *B60R 2011/0043* (2013.01)

(58) Field of Classification Search
CPC .................................................. B60R 11/00
USPC ............................................................ 73/431
See application file for complete search history.

(56) References Cited

U.S. PATENT DOCUMENTS

2016/0039375 A1* 2/2016 Okuyama ............... B60R 19/48
293/117

FOREIGN PATENT DOCUMENTS

JP          5-27037 A      2/1993
JP       2009-287950 A    12/2009

OTHER PUBLICATIONS

Izumi et al. Translation of JP05027037. Published Feb. 1993. Translated Sep. 2019. (Year: 1993).*

* cited by examiner

*Primary Examiner* — Walter L Lindsay, Jr.
*Assistant Examiner* — Philipmarcus T Fadul
(74) *Attorney, Agent, or Firm* — Sughrue Mion, PLLC

(57) ABSTRACT

A surrounding circumstance monitoring apparatus (3) has a housing (31) forming a housing space (31s) therein; and a monitoring unit (32) in the hosing space that monitors a surrounding circumstance of a vehicle, the housing has two housing parts (311, 312) that are bonded to each other via flanges (311f, 312f), a first flange part (311f1, 312f1) protruding upwardly from an upper surface (31U) of the housing is inclined with respect to the upper surface and/or a second flange part (312f2, 312f2) protruding downwardly from a bottom surface (31L) of the housing is inclined with respect to the bottom surface.

4 Claims, 7 Drawing Sheets

[FIG. 1]
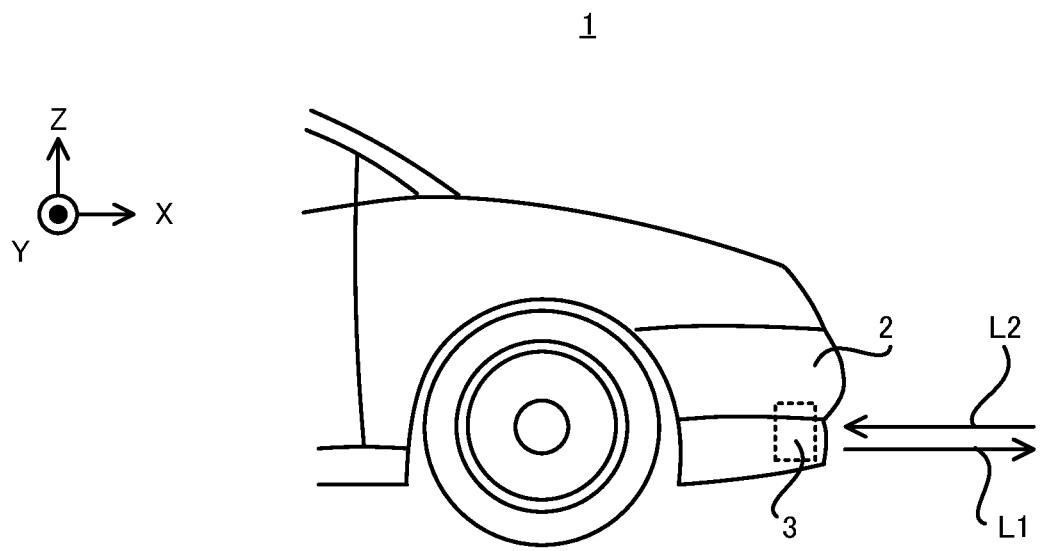
[FIG. 2]
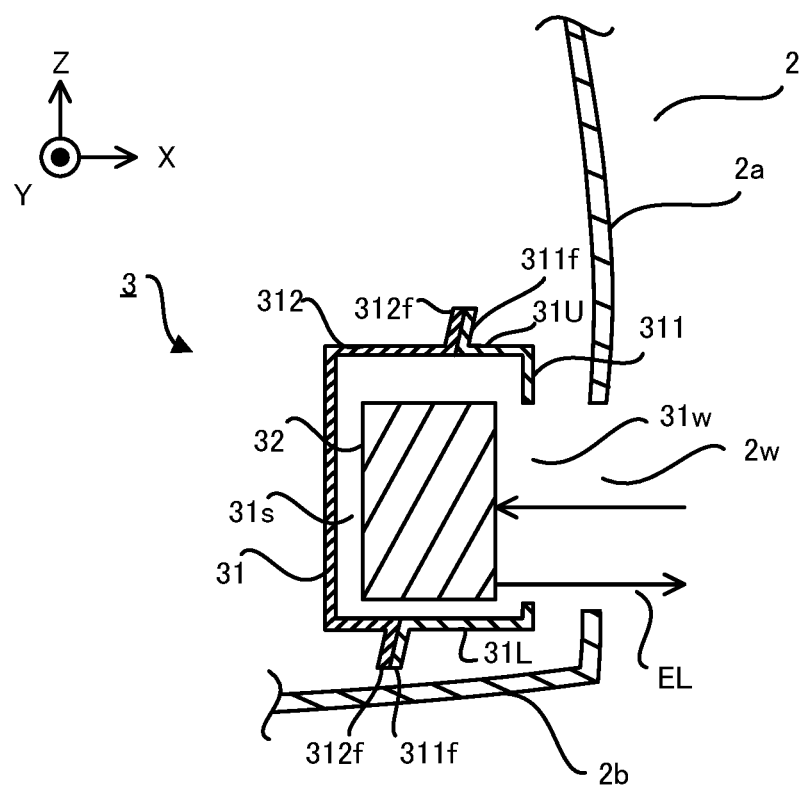

[FIG. 3]
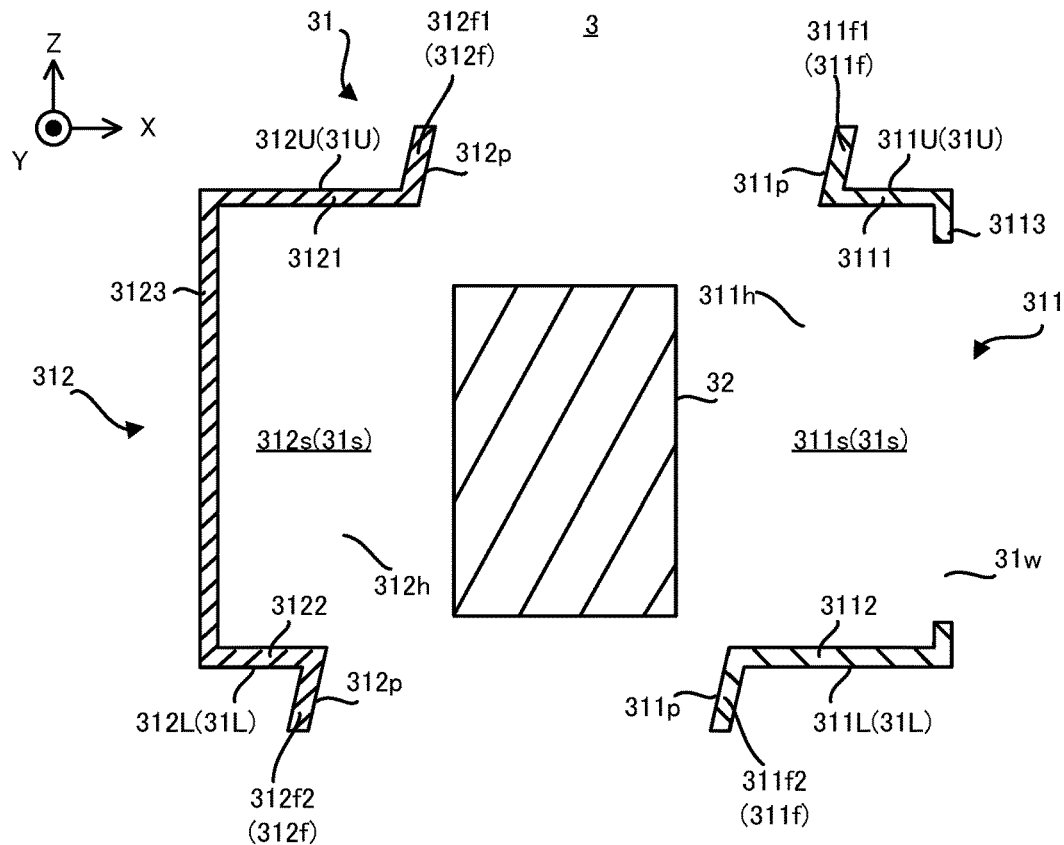
[FIG. 4]
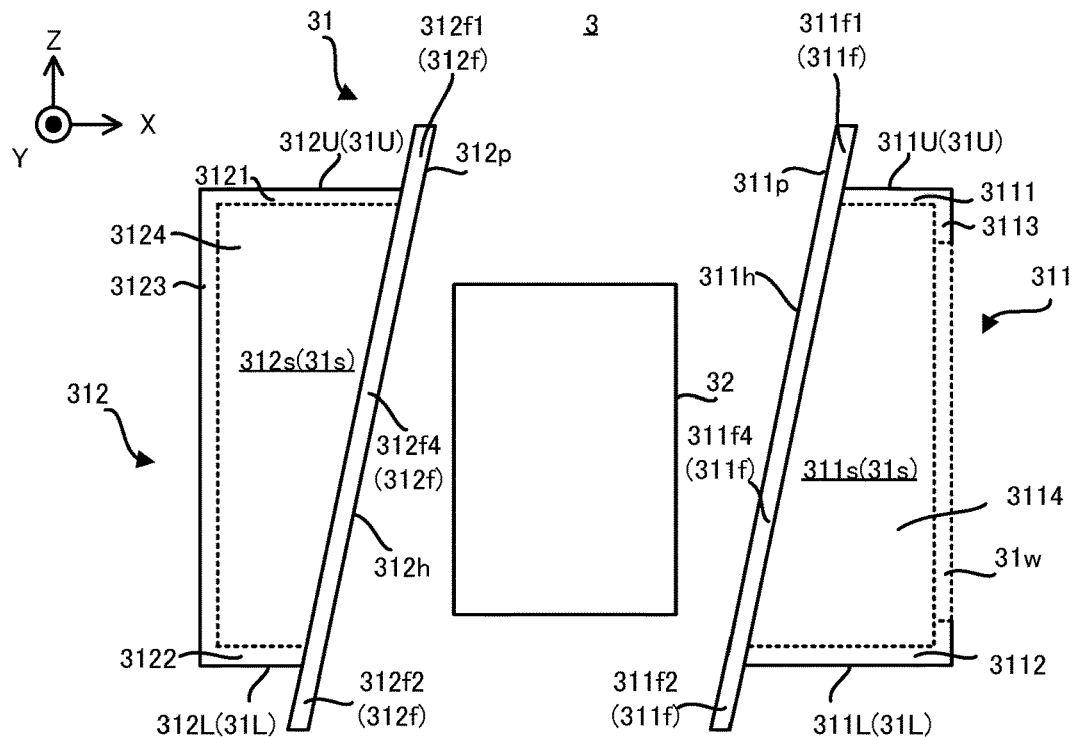

[FIG. 5]
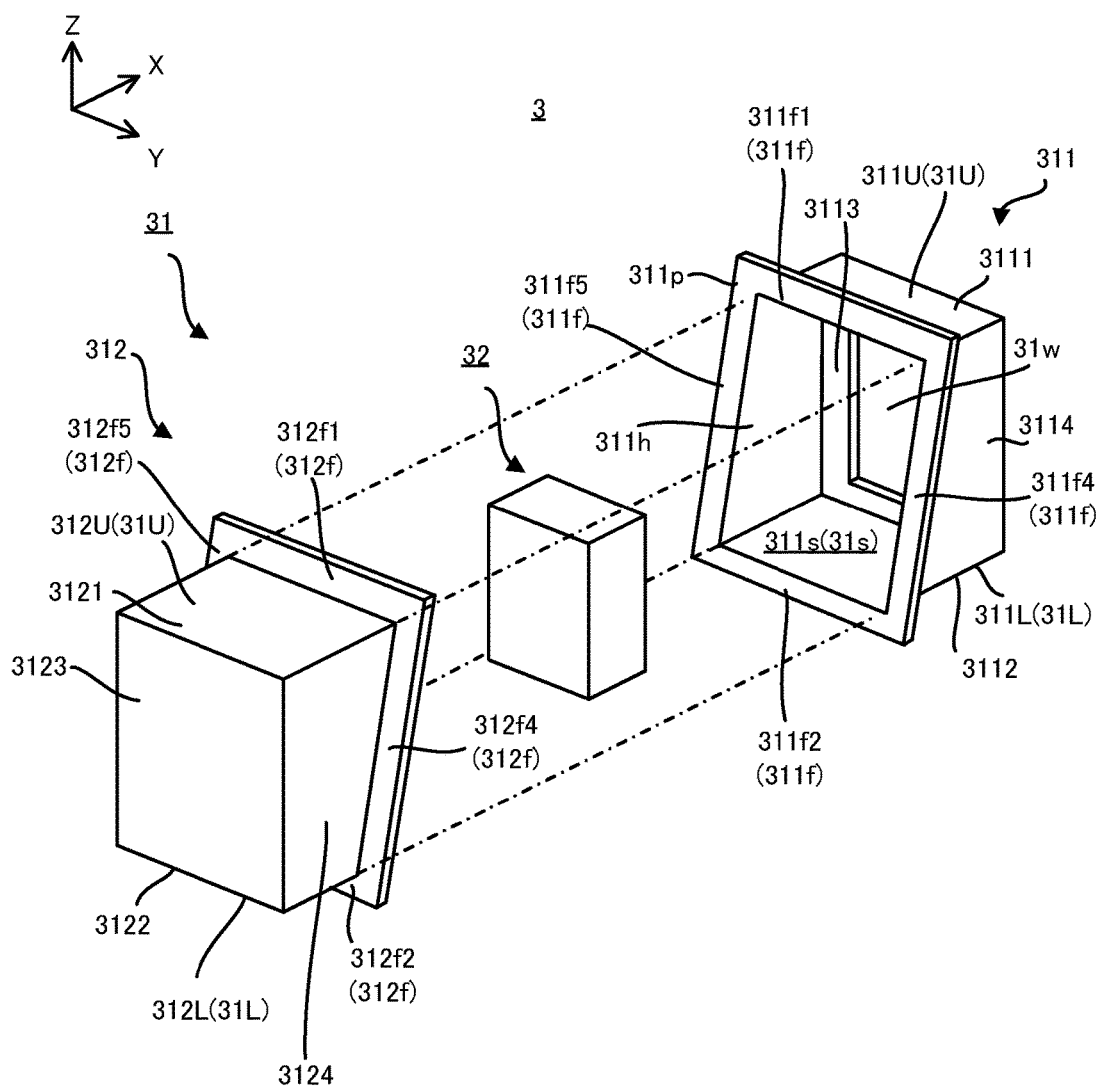

[FIG. 8]
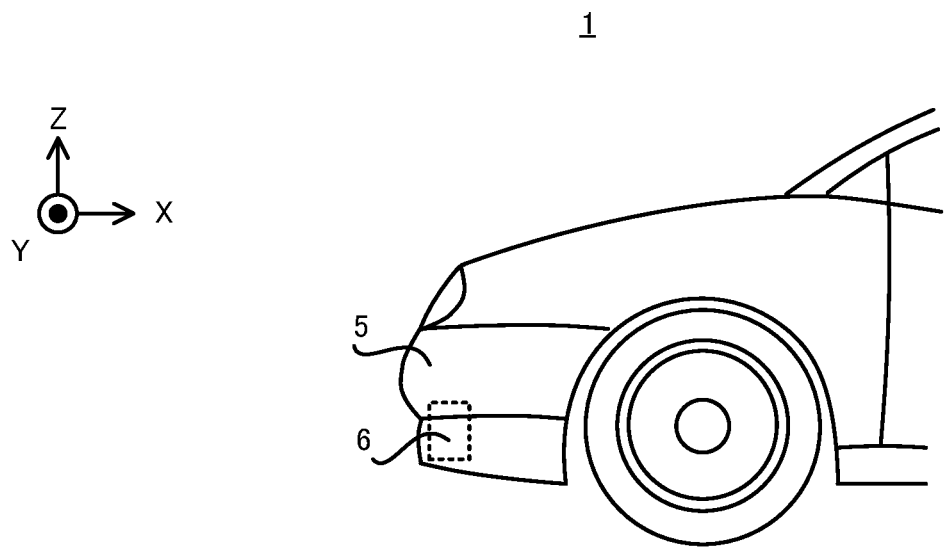
[FIG. 9]
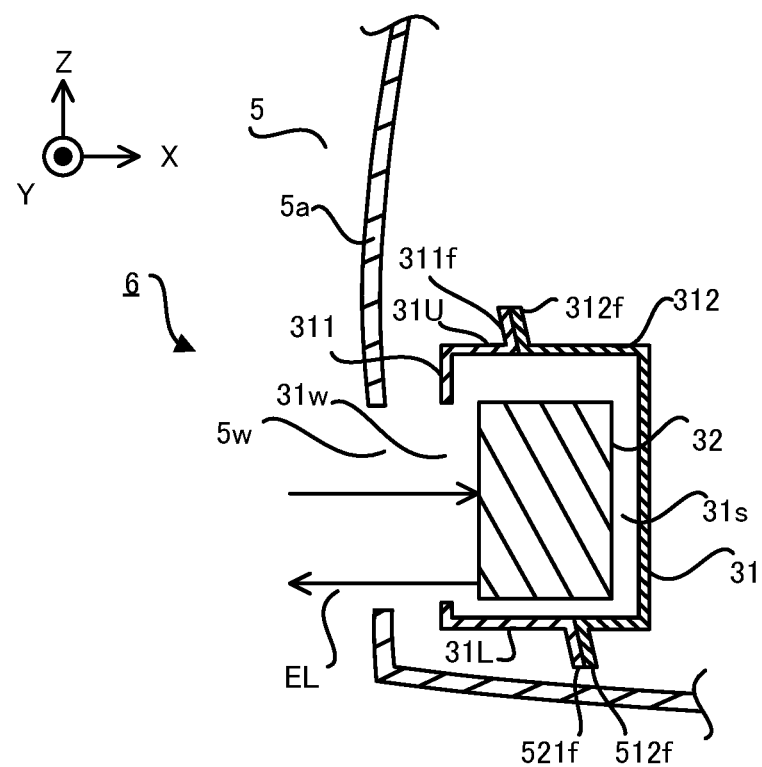

[FIG. 10]
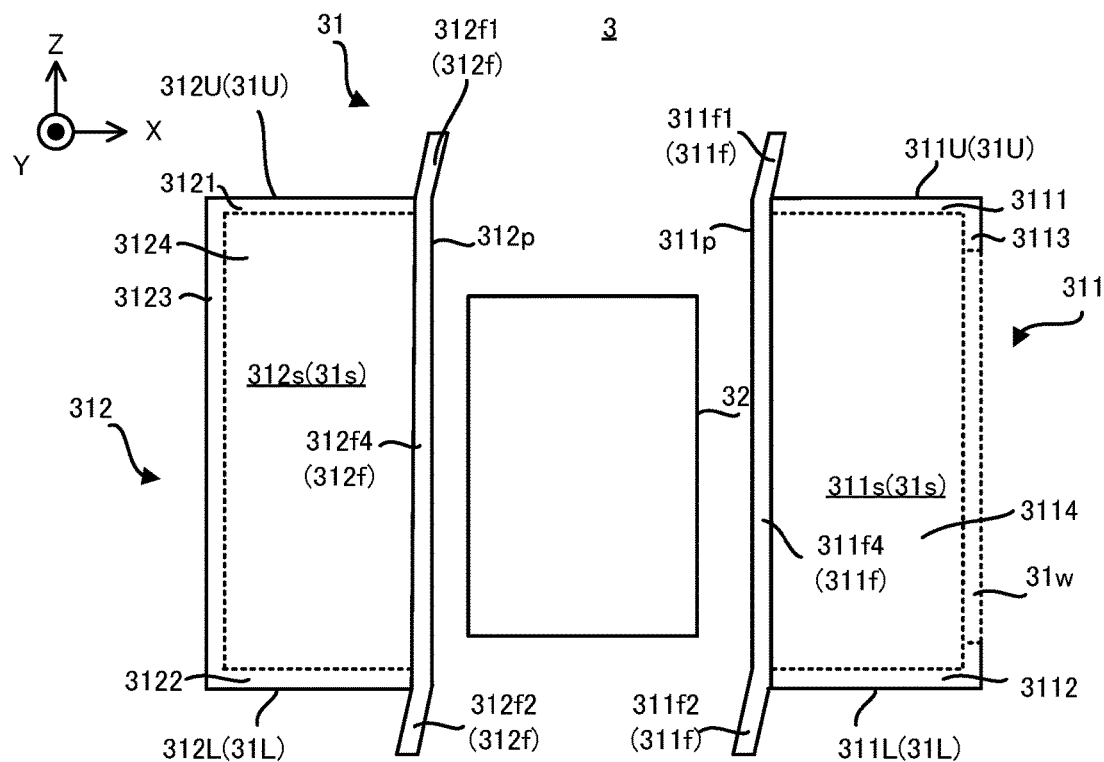

SURROUNDING CIRCUMSTANCE MONITORING APPARATUS

TECHNICAL FIELD

The present invention relates to a technical field of a surrounding circumstance monitoring apparatus that is configured to monitor a surrounding circumstance of a vehicle, for example.

BACKGROUND ART

A vehicle having a surrounding circumstance monitoring apparatus (for example, a radar, a LIDAR (Light Detection and Ranging) or a camera) that is configured to monitor a surrounding circumstance (in other words, a surrounding condition) is becoming available widely. The surrounding circumstance monitoring apparatus is often fixed to an inside of an exterior member (for example, a bumper or a grill) of the vehicle. For example, a Patent Literature 1 discloses a vehicle in which a radar apparatus that is one specific example of the surrounding circumstance monitoring apparatus is fixed to an inside (namely, a backside) of a front grill.

CITATION LIST

Patent Literature

[Patent Literature 1] Japanese Unexamined Patent Application Publication No. 2009-287950

SUMMARY OF INVENTION

Technical Problem

In order to allow the surrounding circumstance monitoring apparatus to monitor the surrounding circumstance, at least one portion of the surrounding circumstance monitoring apparatus (for example, an emitting part that is configured to emit a light, an electromagnetic wave or a ultrasound or a detecting part that is configured to detect the light, the electromagnetic wave or the ultrasound) is required to be exposed from the exterior member. In this case, it is preferable that the exposed part of the surrounding circumstance monitoring apparatus that is exposed from the exterior member do not stand out, considering a good design of the vehicle. From a viewpoint of satisfying this requirement, it is preferable that the surrounding circumstance monitoring apparatus be fixed at a relatively lower position of the vehicle (for example, a position adjacent to a lower member that is one portion of the exterior member and that is located below the surrounding circumstance monitoring apparatus).

On the other hand, the more the surrounding circumstance monitoring apparatus becomes available widely, the higher an accuracy required for the surrounding circumstance monitoring apparatus becomes. In order to allow the surrounding circumstance monitoring apparatus to monitor the surrounding circumstance of the vehicle with the relatively higher accuracy, the size of the surrounding circumstance monitoring apparatus becomes relatively larger. However, if the size of the surrounding circumstance monitoring apparatus that is fixed at the relatively lower position of the vehicle becomes relatively larger, there is a possibility that an aerodynamic performance of a lower part of the vehicle is affected, which is a technical problem.

Specifically, the surrounding circumstance monitoring apparatus has a monitoring unit that includes a circuit board used to monitor the surrounding circumstance of the vehicle and a box-shaped housing that forms a housing space into which the monitoring unit is housed. The housing has two housing parts that are bonded to each other to form the housing space therein, in order to allow the monitoring unit to be housed easily. Two housing parts are bonded to each other via flanges, wherein the flanges are formed at the housing parts respectively to protrude outwardly from the housing in order to ensure waterproof performance of the housing space. In this case, if the size of the surrounding circumstance monitoring apparatus becomes relatively larger, there is a possibility that each flange protrude more at the lower part of the vehicle (in other words, a protruding amount of the flanges becomes larger). As each flange protrudes more at the lower part of the vehicle, there is a higher possibility that the surrounding circumstance monitoring apparatus protrudes from the lower member of the exterior member. As a result, there is a higher possibility that the aerodynamic performance of the vehicle is affected more.

The above described technical problem is one example of the technical problem to be solved by the present invention. It is therefore an object of the present invention to provide, for example, a surrounding circumstance monitoring apparatus that is configured to suppress an adverse effect on the aerodynamics performance.

Solution to Problem

<1>

One aspect of a surrounding circumstance monitoring apparatus of the present invention is a surrounding circumstance monitoring apparatus having: a housing that is configured to form a housing space therein; and a monitoring unit that is housed into the hosing space and that is configured to monitor a surrounding circumstance of a vehicle, the housing has two housing parts that are bonded to each other via flanges to form the housing space therein, the flanges are formed at housing parts respectively to protrude outwardly from the housing, a first flange part that is one portion of the flanges and that protrudes upwardly from an upper surface of the housing being inclined with respect to the upper surface and/or a second flange part that is one portion of the flanges and that protrudes downwardly from a bottom surface of the housing is/are inclined with respect to the bottom surface.

According to one aspect of the surrounding circumstance monitoring apparatus of the present invention, if the first flange part is inclined with respect to the upper surface of the housing, a protruding amount of the first flange part from the upper surface of the housing (specifically, a protruding amount along a direction perpendicular to the upper surface) becomes smaller, compared to a first comparison example in which the first flange part is not inclined with respect to the upper surface of the housing. Therefore, if another component is located above the surrounding circumstance monitoring apparatus in a state where the surrounding circumstance monitoring apparatus is fixed to the vehicle, a gap between this component and the upper surface of the surrounding circumstance monitoring apparatus is allowed to be smaller, compared to the first comparison example. Namely, the surrounding circumstance monitoring apparatus is not necessarily located at an excessively lower position in order to prevent the surrounding circumstance monitoring apparatus from contacting with (in other words, collide against) this component. In other words, the surrounding circumstance monitoring apparatus is allowed to be located at a more upper position, compared to the first comparison example. Thus, a lower edge part of the surrounding circumstance monitoring apparatus (typically, a lower edge part of the second flange part) is allowed to be located at a more upper position, compared to the first comparison example in which the surrounding circumstance monitoring apparatus is needed to be located at a relatively lower position. Thus, there is a less possibility that the surrounding circumstance monitoring apparatus protrudes downwardly from an exterior member (especially, a lower member that is one portion of the exterior member and that is below the surrounding circumstance monitoring apparatus), compared to the first comparison example. As a result, adverse effect on the aerodynamics performance of a lower part of the vehicle from the surrounding circumstance monitoring apparatus is suppressed.

Moreover, if the second flange part is inclined with respect to the bottom surface of the housing, a protruding amount of the second flange part from the bottom surface of the housing (specifically, a protruding amount along a direction perpendicular to the bottom surface) becomes smaller, compared to a second comparison example in which the second flange part is not inclined with respect to the bottom surface of the housing. Therefore, the lower edge part of the surrounding circumstance monitoring apparatus (typically, the lower edge part of the second flange part) is allowed to be located at a more upper position. Thus, there is a less possibility that the surrounding circumstance monitoring apparatus protrudes downwardly from the exterior member (especially, the lower member that is one portion of the exterior member and that is below the surrounding circumstance monitoring apparatus), compared to the second comparison example. As a result, adverse effect on the aerodynamics performance of the lower part of the vehicle from the surrounding circumstance monitoring apparatus is suppressed.

Consequently, according to one aspect of the surrounding circumstance monitoring apparatus of the present invention, the adverse effect on the aerodynamics performance is suppressed.

<2>

In another aspect of the above described surrounding circumstance monitoring apparatus, the surrounding circumstance monitoring apparatus is allowed to be fixed to an inside of an exterior member of the vehicle so that at least one portion of the first flange part and the second flange part is inclined with respect to a vertical direction.

According to this aspect, when the surrounding circumstance monitoring apparatus is fixed to the inside of the exterior member, at least one portion of the first flange part and the second flange part is inclined with respect to the vertical direction. Thus, each of the protruding amount of the first flange part from the upper surface of the housing and the protruding amount of the second flange part from the bottom surface of the housing becomes smaller, compared to a third comparison example in which both of the first flange part and the second flange part are not inclined with respect to the vertical direction (namely, both of the first flange part and the second flange part extend along the vertical direction). As a result, the adverse effect on the aerodynamics performance of the lower part of the vehicle becomes smaller, compared to the third comparison example.

<3>

In another aspect of the above described surrounding circumstance monitoring apparatus, the surrounding circumstance monitoring apparatus is allowed to be fixed to an inside of an exterior member that is located at a front part of the vehicle, the second flange part is inclined so that the second flange part is distant from a front member more as the second flange part is located downwardly more, the front member is at least one portion of the exterior member and is located at a front side of the surrounding circumstance monitoring apparatus.

According to this aspect, a shape of the exterior member (especially, a shape of the lower member that is one portion of the exterior member and that is below the surrounding circumstance monitoring apparatus becomes a shape that allows the adverse effect on the aerodynamics performance to become relatively smaller, in a state where the surrounding circumstance monitoring apparatus is fixed to the vehicle with the exterior member.

Specifically, if the surrounding circumstance monitoring apparatus is fixed to the inside (in other words, a backside or a rear part) of the exterior member that is located at the front part of the vehicle, the second flange part is inclined so that the second flange part is distant from the front member of the exterior member more as the second flange part is located downwardly more. As a result, the lower edge part of the second flange part is located more rearward, compared to a fourth comparison example in which the second flange part is inclined so that the second flange part is close to the front member of the exterior member more as the second flange part is located downwardly more. Thus, the lower member of the exterior member is allowed to be located at a relatively upper position, at a relatively front position at which the lower edge part of the second flange part is not located. Moreover, the lower member of the exterior member is allowed to be located at a relatively lower position to avoid the collision of the lower member to the lower edge part of the second flange part, at a relatively rear position at which the lower edge part of the second flange part is located. As a result, the lower member of the exterior member that is located at the front part of the vehicle is allowed to have a shape in which the lower member is lifted downwardly more as the lower member is located rearward more. This shape of the lower member is a relatively preferable shape for the aerodynamics performance of the front-lower part of the vehicle.

<4>

In another aspect of the above described surrounding circumstance monitoring apparatus, the surrounding circumstance monitoring apparatus is allowed to be fixed to an inside of an exterior member that is located at a rear part of the vehicle, the second flange part is inclined so that the second flange part is distant from a rear member more as the second flange part is located downwardly more, the rear member is at least one portion of the exterior member and is located at a rear side of the surrounding circumstance monitoring apparatus.

According to this aspect, the shape of the exterior member (especially, the shape of the lower member that is one portion of the exterior member and that is below the surrounding circumstance monitoring apparatus becomes a shape that allows the adverse effect on the aerodynamics performance to become relatively smaller, in a condition where the surrounding circumstance monitoring apparatus is fixed to the vehicle with the exterior member.

Specifically, if the surrounding circumstance monitoring apparatus is fixed to the inside (in other words, a backside or a front part) of the exterior member that is located at the rear part of the vehicle, the second flange part is inclined so that the second flange part is distant from the rear member of the exterior member more as the second flange part is located downwardly more. As a result, the lower edge part of the second flange part is located more frontward, compared to a fifth comparison example in which the second flange part is inclined so that the second flange part is close to the rear member of the exterior member more as the second flange part is located downwardly more. Thus, the lower member of the exterior member is allowed to be located at a relatively upper position, at a relatively rear position at which the lower edge part of the second flange part is not located. Moreover, the lower member of the exterior member is allowed to be located at a relatively lower position to avoid the collision of the lower member to the lower edge part of the second flange part, at a relatively front position at which the lower edge part of the second flange part is located. As a result, the lower member of the exterior member that is located at the rear part of the vehicle is allowed to have a shape in which the lower member is lifted upwardly more as the lower member is located rearward more. This shape of the lower member is a relatively preferable shape for the aerodynamics performance of the rear-lower part of the vehicle.

BRIEF DESCRIPTION OF DRAWINGS

FIG. 1 is a side view that illustrates a rear part of a vehicle.

FIG. 2 is a cross-sectional view that illustrates a cross-sectional surface (a cross-sectional surface along an XZ plane) of a LIDAR with a cross-sectional surface of a rear bumper.

FIG. 3 is a cross-sectional view that illustrates the cross-sectional surface of the LIDAR in a condition where parts that constitute the LIDAR are separated in an X axis direction.

FIG. 4 is a side view that illustrates a side surface of the LIDAR in the state where the parts that constitute the LIDAR are separated in the X axis direction.

FIG. 5 is a perspective view that illustrates the LIDAR in the state where the parts that constitute the LIDAR are separated in the X axis direction.

FIG. 8 is a side view that illustrates a front part of a vehicle.

FIG. 9 is a cross-sectional view that illustrates the cross-sectional surface (the cross-sectional surface along an XZ plane) of the LIDAR with a cross-sectional surface of a front bumper.

FIG. 10 is a side view that illustrates the LIDAR in which at least one portion of the flanges is inclined with respect the upper surface and the lower surface of a housing.

DESCRIPTION OF EMBODIMENTS

Figures 6A, 6B:
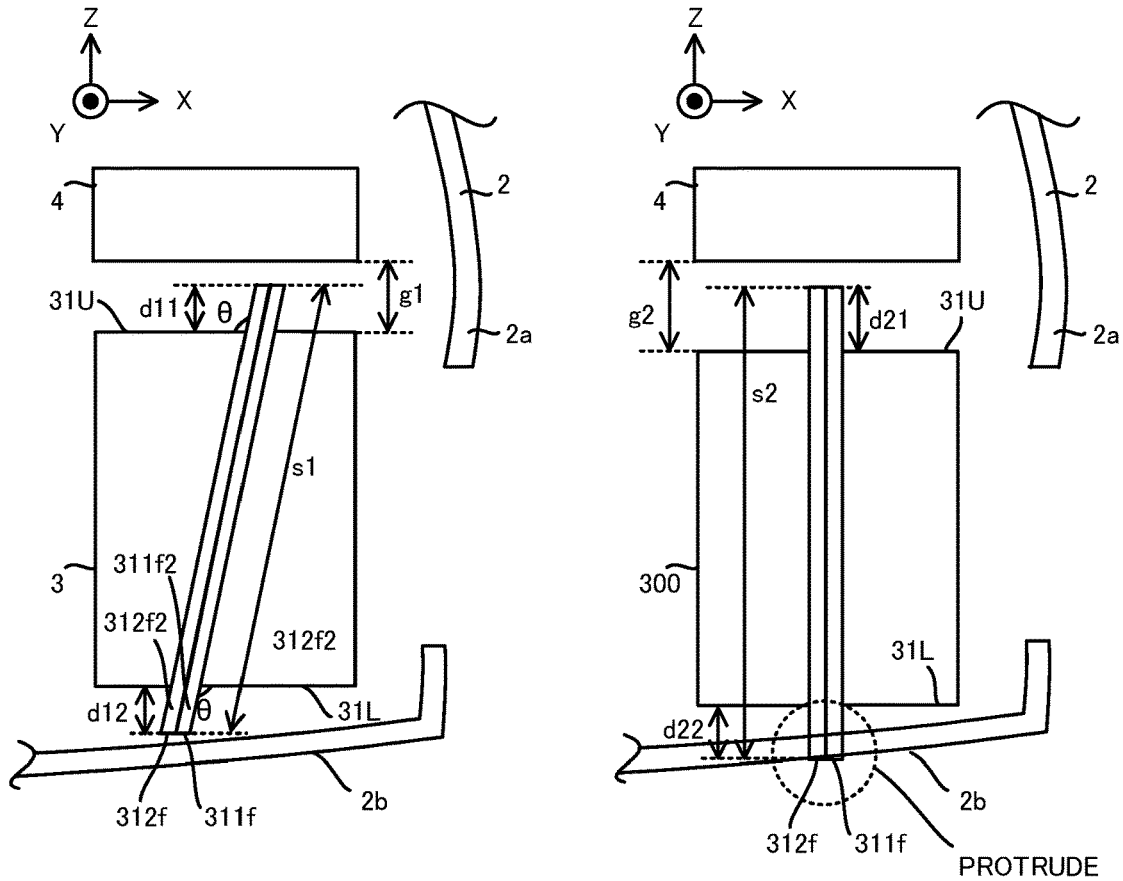
FIG. 6(a) is a cross-sectional view that illustrates a state where the LIDAR in the present embodiment having flanges that are inclined with respect to both of an upper surface and a lower surface is attached to a vehicle.
FIG. 6(b) is a cross-sectional view that illustrates a state where a LIDAR in a comparison example having flanges that are not inclined with respect to (namely, that are perpendicular to) both of the upper surface and the lower surface is attached to a vehicle

Hereinafter, with reference to drawings, one embodiment of the surrounding circumstance monitoring apparatus of the present invention will be described. In the following description, a vehicle 1 to which one embodiment of the surrounding circumstance monitoring apparatus of the present invention is adapted will be described. In the following description, a positional relationship among parts of the vehicle 1 is described by using an XYZ coordinate system that is defined by an X axis, a Y axis and a Z axis that are perpendicular to one another. In this case, an X axis direction corresponds to a front-back direction (namely, a longitudinal direction) of the vehicle 1, a Y axis direction corresponds to a width direction of the vehicle 1 and a Z axis direction corresponds to an up-down direction (namely, a vertical direction) of the vehicle 1. Moreover, +X side corresponds to a rear side when the vehicle 1 is regarded as a center, −X side corresponds to a front side when the vehicle 1 is regarded as a center, +Y side corresponds to a left side when the vehicle 1 is regarded as a center, −Y side corresponds to a right side when the vehicle 1 is regarded as a center, +Z side corresponds to a upper side when the vehicle 1 is regarded as a center and −Z side corresponds to a lower side when the vehicle 1 is regarded as a center, (1) STRUCTURE OF VEHICLE 1

Firstly, with reference to FIG. 1, the structure of the vehicle 1 in the present embodiment will be explained. FIG. 1 is a side view that illustrates a rear part of the vehicle 1. As illustrated in FIG. 1, the vehicle 1 has a rear bumper 2 that is one specific example of the above described "exterior member". The rear bumper 2 is located at the rear part of the vehicle 1. A LIDAR (Light Detection and Ranging, Laser Imaging Detection and Ranging) that is one specific example of the above described "surrounding circumstance monitoring apparatus" is fixed to an inside (namely, a back side or a front part) of the rear bumper 2 via a non-illustrated stay. Namely, in the present embodiment, the LIDAR 3 is attached to the vehicle 1 in a state where the LIDAR 3 is fixed to the rear bumper 2.

The LIDAR 3 is an apparatus that is configured to monitor a surrounding circumstance of the vehicle 1 (a rear circumstance of the vehicle 1 in an example illustrated in FIG. 1). The LIDAR 3 is configured to emit a detection light L1 (for example, a visible light, a ultraviolet light or an infrared light) rearward side from the vehicle 1. Moreover, the LIDAR 3 is configured to receive (in other words, detect) a reflected light L2 that is generated by the detection light L1 being reflected by an object that is located in the rear of the vehicle 1. A non-illustrated ECU (Electronic Control Unit) of the vehicle 1 is allowed to monitor the surrounding circumstance of the vehicle 1 by analyzing a result of receiving the reflected light L2 by the LIDAR 3.

(2) STRUCTURE OF LIDAR 3

Next, with reference to FIG. 2 to FIG. 5, a structure of the LIDAR 3 will be described. FIG. 2 is a cross-sectional view that illustrates a cross-sectional surface (a cross-sectional surface along an XZ plane) of the LIDAR 3 with a cross-sectional surface of the rear bumper 2. FIG. 3 is a cross-sectional view that illustrates the cross-sectional surface of the LIDAR 3 in a state where parts that constitute the LIDAR 3 are separated in the X axis direction. FIG. 4 is a side view that illustrates a side surface of the LIDAR 3 in the state where parts that constitute the LIDAR 3 are separated in the X axis direction. FIG. 5 is a perspective view that illustrates the LIDAR 3 in the state where the parts that constitute the LIDAR 3 are separated in the X axis direction.

As illustrated in FIG. 2 to FIG. 5, the LIDAR 3 has a housing 31 and an optical unit 32 that is one specific example of the above described "monitoring unit".

The housing 31 has any shape in appearance. For example, FIG. 2 to FIG. 5 illustrate an example in which the housing 31 has a box-shape (for example, a rectangular solid shape) in appearance. As one example, the housing 31 has a box-shape in which a size along the up-down direction (namely, the Z axis direction) is smaller than a size along the front-back direction (namely, the X axis direction). The housing 31 forms a housing space 31s therein. The optical unit 32 is housed in the housing space 31s. The optical unit 32 is fixed to an inner wall of the housing 31 that forms the housing space 31s via a non-illustrated stay.

The optical unit 32 has a structure that is same as a structure of an optical unit of an existing LIDAR. For example, the optical unit 32 has: an optical system that is configured to emit the detection light L1 and receive the reflected light L2; and a control circuit that is configured to control the optical system so that the optical system emits the detection light L1 and receives the reflected light L2. One example of the optical system is an optical system that has: an optical source; a mirror (in other word, a refracting optical element); a motor that is configured to move the mirror; a lens (in other words, a reflecting optical element) and a light receiving element (in other words, a photodetector).

An optical window 31w is formed at the housing 31 so that the optical unit 32 is allowed to emit the detection light L1 from the inside of the housing 31 to an exterior of the housing 31 via the optical window 31w and the housing 31 is allowed to receive the reflected light L2 from the exterior of the housing 31 via the optical window 31w. The detection light L1 and the reflected light L2 are allowed to pass through the optical window 31w. FIG. 2 to FIG. 5 illustrate an example in which the optical window 31w is an aperture (in other words, a through hole) that is formed at a side wall (especially, a side wall that is located in the rear of the optical unit 32) of the housing 31. Moreover, an optical window 2w through which the detection light L1 and the reflected light L2 are allowed to pass is formed at the rear bumper 2. The optical window 2w and the optical window 31w are arranged along an optical path of the detection light L1 and the reflected light L2. FIG. 2 to FIG. 5 illustrate an example in which the optical window 2w is an aperture (in other words, a through hole) formed at a rear member 2a that is at least one portion of the rear bumper 2 and that is located in the rear of (in other words, behind) the LIDAR 3.

The housing 31 includes two housing parts (specifically, a rear housing part 311 and a front housing part 312) that are arranged along the front-back direction of the vehicle 1. The rear housing part 311 and the front housing part 312 are allowed to be bonded to each other and to be separated (in other words, detached) from each other. When the optical unit 32 is housed in the housing space 31s, the optical unit 32 is firstly housed in the housing space 31s in a state where the rear housing part 311 and the front housing part 312 are separated from each other and then the rear housing part 311 and the front housing part 312 are bonded to each other in a state where the optical unit 32 is housed in the housing space 31s. When the optical unit 32 is brought out from the housing space 31s, the rear housing part 311 and the front housing part 312 are firstly separated from each other in a state where the optical unit 32 is housed in the housing space 31s and then the optical unit 32 is brought out from the housing space 31s in a state where the rear housing part 311 and the front housing part 312 are separated from each other.

This structure of the housing 31 allows the optical unit 32 to be housed in the housing space 31s easily. Moreover, this structure of the housing 31 allows the optical unit 32 to be brought out from the housing space 31s easily. Note that FIG. 2 illustrates a state where the rear housing part 311 and the front housing part 312 are bonded to each other and each of FIG. 3 to FIG. 5 illustrates a state where the rear housing part 311 and the front housing part 312 are separated from each other.

The rear housing part 311 is located in the rear of (alternatively, at a rear side of) the front housing part 312. The rear housing part 311 is a box-shaped housing forming a housing space 311s therein. The housing space 311s is a space that is surrounded by a side wall of the rear housing part 311. The side wall that surrounds the housing space 311s includes: an upper wall 3111 that is located above the housing space 311s; a lower wall 3112 that is located below the housing space 311s; a rear wall 3113 that is located in the rear of the housing space 311s; a left wall 3114 that is located at the left side of the housing space 311s; a left wall 3114 that is located at the left side of the housing space 311s; and a right wall 3115 that is located at the right side of the housing space 311s. Note that at least one portion of the side wall of the rear housing part 311 is omitted in FIG. 2 to FIG. 5 for the purpose of the simple illustration. The housing space 311s communicates with an exterior of the rear housing part 311 via an aperture 311h that is formed at a front part of the rear housing part 311 (specifically, at a position facing the rear wall 3113 along the front-back direction of the vehicle 1). The housing space 311s corresponds to one portion of the housing space 31s. Note that the optical window 31w is formed at the rear surface 3113.

The front housing part 312 is located in front of (alternatively, at a front side of) the rear housing part 311. The front housing part 312 is a box-shaped housing forming a housing space 312s therein. The housing space 312s is a space that is surrounded by a side wall of the front housing part 312. The side wall that surrounds the housing space 312s includes: an upper wall 3121 that is located above the housing space 312s; a lower wall 3122 that is located below the housing space 312s; a front wall 3123 that is located in front of the housing space 312s; a left wall 3124 that is located at the left side of the housing space 312s; a left wall 3124 that is located at the left side of the housing space 312s; and a right wall 3125 that is located at the right side of the housing space 312s. Note that at least one portion of the side wall of the rear housing part 312 is omitted in FIG. 2 to FIG. 5 for the purpose of the simple illustration. The housing space 312s communicates with an exterior of the front housing part 312 via an aperture 312h that is formed at a rear part of the front housing part 312 (specifically, at a position facing the front wall 3123 along the front-back direction of the vehicle 1). The housing space 312s corresponds to one portion of the housing space 31s. The housing space 312s communicates with the housing space 311s in a state where the rear housing part 311 and the front housing part 312 are bonded to each other and thus constitutes the housing space 31s with the housing space 311s.

The rear housing part 311 and the front housing part 312 are bonded via a flange 311f that is formed at the rear housing part 311 and a flange 312f that is formed at the front housing part 312. Namely, the rear housing part 311 and the front housing part 312 are bonded so that the flange 311f and the flange 312f are closely attached to each other.

The flange 311f is a member that protrudes toward outwardly from the rear housing part 311 around the aperture 311h. Specifically, the flange 311f includes: a flange part 311*f*1 that protrudes upwardly from a front edge part of the upper wall 3111; a flange part 311*f*2 that protrudes downwardly from a front edge part of the lower wall 3112; a flange part 311*f*4 that protrudes leftward from a front edge part of the left wall 3114; and a flange part 311*f*5 that protrudes rightward from a front edge part of the right wall 3115. A bonded surface 311*p* of the flange 311*f* (namely, a surface that are closely attached to the flange 312*f*) surrounds the aperture 311*h*.

The flange 312*f* is a member that protrudes toward outwardly from the front housing part 312 around the aperture 312*h*. Specifically, the flange 312*f* includes: a flange part 312*f*1 that protrudes upwardly from a rear edge part of the upper wall 3121; a flange part 312*f*2 that protrudes downwardly from a rear edge part of the lower wall 3122; a flange part 312*f*4 that protrudes leftward from a rear edge part of the left wall 3124; and a flange part 312*f*5 that protrudes rightward from a rear edge part of the right wall 3125. A bonded surface 312*p* of the flange 312*f* (namely, a surface that are closely attached to the flange 3110 surrounds the aperture 312*h*. The bonded surface 312*p* is parallel to the bonded surface 311*p*.

Water proof performance of the housing space 31*s* is appropriately ensured, because the rear housing part 311 and the front housing part 312 are bonded to each other via the flange 311*f* and the flange 312*f*. Namely, water proof performance of the optical unit 32 that is housed in the housing space 31*s* is appropriately ensured Especially in the present embodiment, the flange 311*f* is inclined with respect to at least one of the upper wall 3111 and the lower wall 3112. Namely, the flange 311*f* is a plate member that protrudes from the rear housing part 311 so that the flange 311*f* is inclined with respect to at least one of the upper wall 3111 and the lower wall 3112. In the present embodiment, the upper wall 3111 is parallel to the lower wall 3112. Thus, the flange 311*f* is inclined with respect to both of the upper wall 3111 and the lower wall 3112. More specifically, the flange 311*f* is inclined with respect to at least one of an upper surface 311U (namely, a surface facing the upper side) of the upper wall 3111 and a lower surface 311L (namely, a surface facing the lower side) of the lower wall 3112. In the present embodiment, the upper surface 311U is parallel to the lower surface 311L. Thus, the flange 311*f* is inclined with respect to both of the upper surface 311U and the lower surface 311L.

Moreover, the flange 312*f* is inclined with respect to at least one of the upper wall 3121 and the lower wall 3122. Namely, the flange 312*f* is a plate member that protrudes from the front housing part 312 so that the flange 312*f* is inclined with respect to at least one of the upper wall 3121 and the lower wall 3122. In the present embodiment, the upper wall 3121 is parallel to the lower wall 3122. Thus, the flange 312*f* is inclined with respect to both of the upper wall 3121 and the lower wall 3122. More specifically, the flange 312*f* is inclined with respect to at least one of an upper surface 312U (namely, a surface facing the upper side) of the upper wall 3121 and a lower surface 312L (namely, a surface facing the lower side) of the lower wall 3122. In the present embodiment, the upper surface 312U is parallel to the lower surface 312L. Thus, the flange 312*f* is inclined with respect to both of the upper surface 312U and the lower surface 312L.

The upper surface 311U corresponds to one portion of an upper surface 31U of the housing 31 (namely, an outer surface of the housing 31 that faces the upper side). The lower surface 311L corresponds to one portion of a lower surface 31L of the housing 31 (namely, an outer surface of the housing 31 that faces the lower side). The upper surface 312U corresponds to one portion of the upper surface 31U of the housing 31. The lower surface 312L corresponds to one portion of the lower surface 31L of the housing 31. Therefore, each of the flange 311*f* and the flange 312*f* is inclined with respect to at least one of the upper surface 31U and the lower surface 31L. Note that FIG. 2 to FIG. 5 illustrate an example in which each of the flange 311*f* and the flange 312*f* is inclined with respect to both of the upper surface 31U and the lower surface 31L. Moreover, it is preferable that the upper surface 312U be parallel to the upper surface 311U, however, the upper surface 312U may not be parallel to the upper surface 311U. It is preferable that the lower surface 312L be parallel to the lower surface 311L, however, the lower surface 312L may not be parallel to the lower surface 311L.

A state where the "flange 311*f* is inclined with respect to X" in the present embodiment means a state where an angle between the flange 311*f* and X is not 90 degree. Typically, the state where the "flange 311*f* is inclined with respect to X" in the present embodiment means a state where the angle between the flange 311*f* and X is a first angle that is larger than 0 degree and smaller than 90 degree or a second angle that is larger than 90 degree and smaller than 180 degree. The angle between the flange 311*f* and X means an angle between an outer surface (for example, the bonded surface 311*p* or a surface opposite to the bonded surface 311*p*) of the flange 311*f* and X. The same is true for a state where the "flange 312*f* is inclined with respect to X" in the present embodiment. Namely, the state where the "flange 311*f* is inclined with respect to X" in the present embodiment means a state where an angle between the flange 312*f* and X is not 90 degree It is preferable that the flange 311*f* be inclined so that the flange 311*f* is distant from the rear member 2*a* of the rear bumper 2 more as the flange 311*f* is located downwardly more. As a result, a position at which the flange 311*f* protrudes from the lower surface 31L is ahead of a position at which the flange 311*f* protrudes from the upper surface 31U. In other words, the flange 311*f* protrudes from the lower surface 31L at a relatively front position and the flange 311*f* protrudes from the upper surface 31U at a relatively rear position. Same is true for the flange 312*f*. Namely, It is preferable that the flange 312*f* be inclined so that the flange 312*f* is distant from the rear member 2*a* more as the flange 312*f* is located downwardly more.

(3) TECHNICAL EFFECT

Next, with reference to FIG. 6(*a*) to FIG. 6(*b*), a technical effect that is achieved by the LIDAR 3 in the present embodiment will be described. Firstly, FIG. 6(*a*) is a cross-sectional view that illustrates a state where the LIDAR 3 in the present embodiment having flanges 311*f* and 312*f* that are inclined with respect to both of the upper surface 31U and the lower surface 31L is attached to the vehicle 1. On the other hand, FIG. 6(*b*) is a cross-sectional view that illustrates a state where a LIDAR 300 in a comparison example having flanges 311*f* and 312*f* that are not inclined with respect to (namely, that are perpendicular to) both of the upper surface 31U and the lower surface 31L is attached to the vehicle 1.

Firstly, as a precondition, a length s1 between an upper edge part of the flange 311*f* to a lower edge part of the flange 311*f* (a length s1 between an upper edge part of the flange 312*f* to a lower edge part of the flange 312*f*) in the present embodiment is same as a length s2 between an upper edge part of the flange 311*f* to a lower edge part of the flange 311*f*

(a length s2 between an upper edge part of the flange 312*f* to a lower edge part of the flange 312*f*) in the comparison example. Namely, the as a precondition, a length s1 between an upper edge part of the bonded surface 311*p* to a lower edge part of the bonded surface 311*p* (a length s1 between an upper edge part of the bonded surface 312*p* to a lower edge part of the bonded surface 312*p*) in the present embodiment is same as a length s2 between an upper edge part of the bonded surface 311*p* to a lower edge part of the bonded surface 311*p* (a length s2 between an upper edge part of the bonded surface 312*p* to a lower edge part of the bonded surface 312*p*) in the comparison example.

Figure 6C:
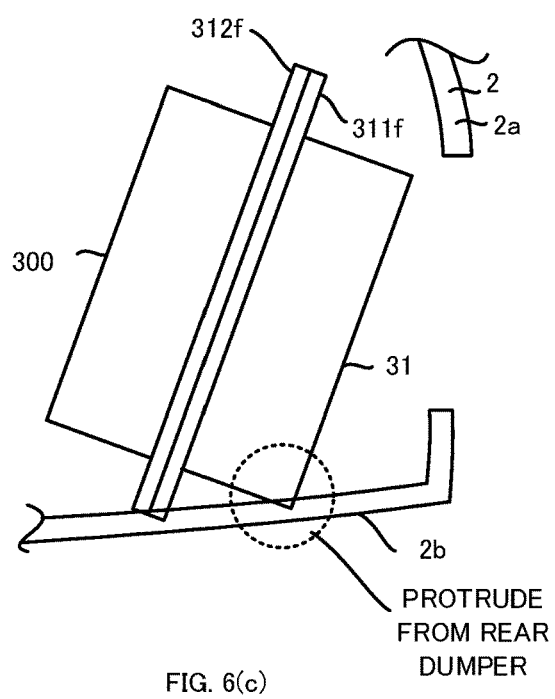
FIG. 6(c) is a cross-sectional view that illustrate a state where the LIDAR in FIG. 6(b) is rotated around a Y axis.

In this case, as illustrated in FIG. 6(*a*) to FIG. 6(*b*), a protruding amount d11 of each of the flange 311*f* and the flange 312*f* from the upper surface 31U upwardly in LIDAR 3 in the present embodiment is smaller than a protruding amount d21 of each of the flange 311*f* and the flange 312*f* from the upper surface 31U upwardly in LIDAR 300 in the comparison example. Specifically, if the angle between each of the flange 311*f* and the flange 312*f* and the upper surface 31U is represented by θ, the protruding amount d11 is sin θ times as large as the protruding amount d21. Therefore, if another component (FIG. 6(*a*) illustrates an example in which another component is a bumper reinforce 4) is located above the LIDAR 3 in a state where the LIDAR 3 is attached to the vehicle 1, a gap between the upper surface 31U of the LIDAR 3 and the bumper reinforce 4 can be reduced, compared to the comparison example. Namely, the gap g1 between the upper surface 31U of the LIDAR 3 in the present embodiment and the bumper reinforce 4 is smaller than the gap g2 between the upper surface 31U of the LIDAR 300 in the comparison example and the bumper reinforce 4. As a result, the LIDAR 3 is not necessarily located at an excessively lower position in order to prevent the LIDAR 3 from contacting with (in other words, collide against) the bumper reinforce 4. In other words, the LIDAR 3 is allowed to be located at a more upper position, compared to the comparison example. Thus, a lower edge part of the LIDAR 3 (typically, the lower edge part of each of the flange 311*f* and the flange 312*f*) is allowed to be located at a more upper position, compared to the comparison example in which the LIDAR 300 is needed to be located at a relatively lower position. Thus, there is a less possibility that the LIDAR 3 protrudes downwardly from the rear bumper 2 (especially, a lower member 2*b* that is one portion of the rear bumper 2 and that is below the LIDAR 3), compared to the comparison example. As a result, adverse effect on the aerodynamics performance of a lower part of the vehicle 1 from the LIDAR 3 is suppressed.

Similarly, a protruding amount d12 of each of the flange 311*f* and the flange 312*f* from the lower surface 31L downwardly in LIDAR 3 in the present embodiment is smaller than a protruding amount d22 of each of the flange 311*f* and the flange 312*f* from the lower surface 31L downwardly in LIDAR 300 in the comparison example. Specifically, if the angle between each of the flange 311*f* and the flange 312*f* and the lower surface 31L is represented by θ, the protruding amount d11 is sin θ times as large as the protruding amount d21 and the protruding amount d12 is sin θ times as large as the protruding amount d22. Therefore, the lower edge part of the LIDAR 3 is allowed to be located at a more upper position, compared to the comparison example. Thus, there is a less possibility that the LIDAR 3 protrudes downwardly from the lower member 2*b* of the rear bumper 2, compared to the comparison example. As a result, the adverse effect on the aerodynamics performance of the lower part of the vehicle 1 from the LIDAR 3 is suppressed.

Moreover, the length s1 between the upper edge part of the flange 311*f* to the lower edge part of the flange 311*f* (the length s1 between the upper edge part of the flange 312*f* to the lower edge part of the flange 312*f*) in the present embodiment is same as the length s2 between the upper edge part of the flange 311*f* to the lower edge part of the flange 311*f* (the length s2 between the upper edge part of the flange 312*f* to the lower edge part of the flange 312*f*) in the comparison example. Therefore, the waterproof performance by the flange 311*f* and the flange 312*f* does not deteriorate. Namely, the present embodiment is more useful than the comparison example in that the adverse effect on the aerodynamics performance of the lower part of the vehicle 1 from the LIDAR 3 is suppressed while keeping the waterproof performance.

Incidentally, even in the LIDAR 300 in the comparison example, if the LIDAR 300 in FIG. 6(*b*) is rotated around the Y axis, a positional relationship among the flange 311*f*, the flange 312*f* and the rear bumper 2 (especially, the lower part 2*b*) is allowed to be same as the positional relationship in the present embodiment, as illustrated in FIG. 6(*c*). However, in this case, as illustrated in FIG. 6(*c*), the housing 31 is also rotated by a same rotational amount. Thus, there is a possibility that the housing 31 protrudes downwardly from the lower part 2*b* of the rear bumper 2. Therefore, the technical effect of suppressing the adverse effect on the aerodynamics performance of the lower part of the vehicle 1 from the LIDAR 3 is unique to the present embodiment.

Moreover, in the present embodiment, each of the flange 311*f* and the flange 312*f* is allowed to be inclined so that each of the flange 311*f* and the flange 312*f* is distant from the rear member 2*a* of the rear bumper 2 more as each of the flange 311*f* and the flange 312*f* is located downwardly more. Therefore, each of the flange part 311*f*2 of the flange 311*f* that protrudes downwardly and the flange part 312*f*2 of the flange 312*f* that protrudes downwardly is allowed to be inclined so that each of the flange part 311*f*2 and the flange part 312*f*2 is distant from the rear member 2*a* of the rear bumper 2 more as each of the flange part 311*f*2 and the flange part 312*f*2 is located downwardly more. As a result, a lower edge part of each of the flange part 311*f*2 and the flange part 312*f*2 (namely, the lower edge part of each of the flange 311*f* and the flange 312*f*) is located more frontward, compared to a comparison example in which each of the flange part 311*f*2 and the flange part 312*f*2 is inclined so that each of the flange part 311*f*2 and the flange part 312*f*2 is close to the rear member 2*a* more as each of the flange part 311*f*2 and the flange part 312*f*2 is located downwardly more. Thus, the lower member 2*b* of the rear bumper 2 is allowed to be located at a relatively upper position, at a relatively rear position at which the lower edge part of each of the flange 311*f* and the flange 312*f* is not located. Moreover, the lower member 2*b* of the rear bumper 2 is allowed to be located at a relatively lower position to avoid the collision of the lower member 2*b* to the lower edge part of each of the flange 311*f* and the flange 312*f*, at a relatively front position at which the lower edge part of each of the flange 311*f* and the flange 312*f* is located. As a result, as illustrated in FIG. 6(*a*), the lower member 2*b* of the rear bumper 2 is allowed to have a shape in which the lower member 2*b* is lifted upwardly more as the lower member 2*b* is located rearward more. This shape of the lower member 2*b* is a relatively preferable shape for the aerodynamics performance of the rear-lower part of the vehicle 1.

Moreover, the LIDAR 3 is allowed to be attached at a position adjacent to the lower member 2*b* of the rear bumper 2 (namely, a relatively lower position of the vehicle 1). Thus, an exposed part of the LIDAR 3 that is exposed from the rear bumper 2 via the optical window 2w is allowed not to stand out. This is useful for a design of the vehicle 1.

(4) MODIFIED EXAMPLE

(4-1) First Modified Example

Figure 7A:
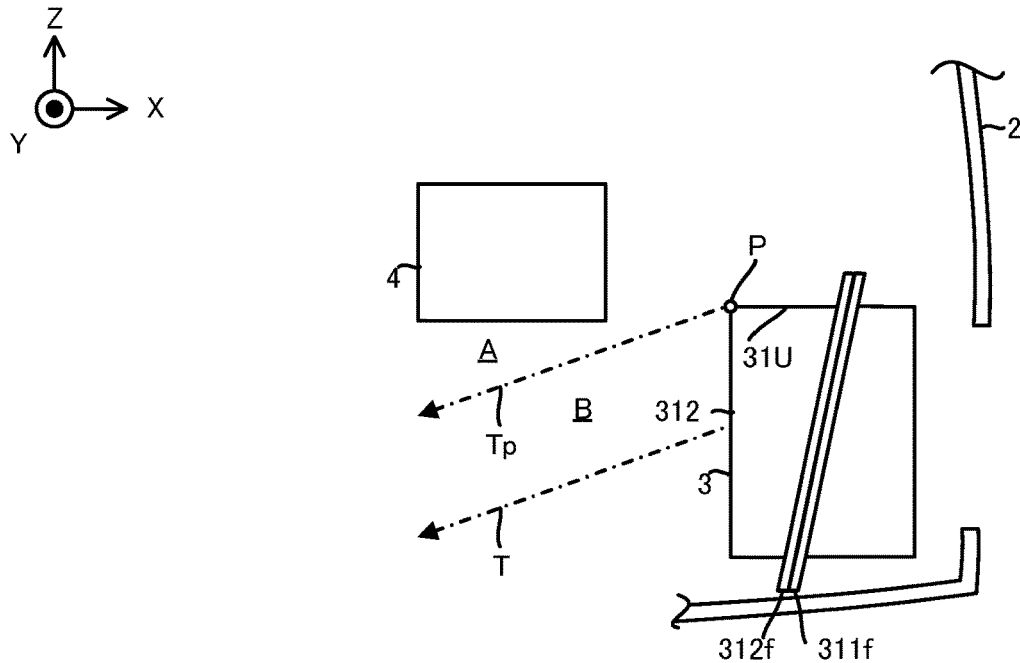
FIG. 7(a) is a side view that illustrates the LIDAR that is not yet attached to the vehicle and FIG. 7(b) is a side view that illustrates the LIDAR that is already attached to the vehicle.

When the LIDAR 3 is attached to the vehicle 1, the LIDAR 3 is firstly fixed (namely, attached) to the rear bumper 2 that is not yet attached to the vehicle 1. Then, the rear bumper 2 to which the LIDAR 3 is already fixed is fixed (namely, attached) to the vehicle 1 to which the bumper reinforce 4 is already attached. When the rear bumper 2 to which the LIDAR 3 is already fixed is fixed to the vehicle 1, as illustrated in FIG. 7(a), the rear bumper 2 is moved along a predetermined trajectory T from a start position that is in front of the vehicle 1 toward an attach position at which the rear bumper 2 is attached. As a result, the rear bumper 2 is attached at the attach position.

Figure 7B:
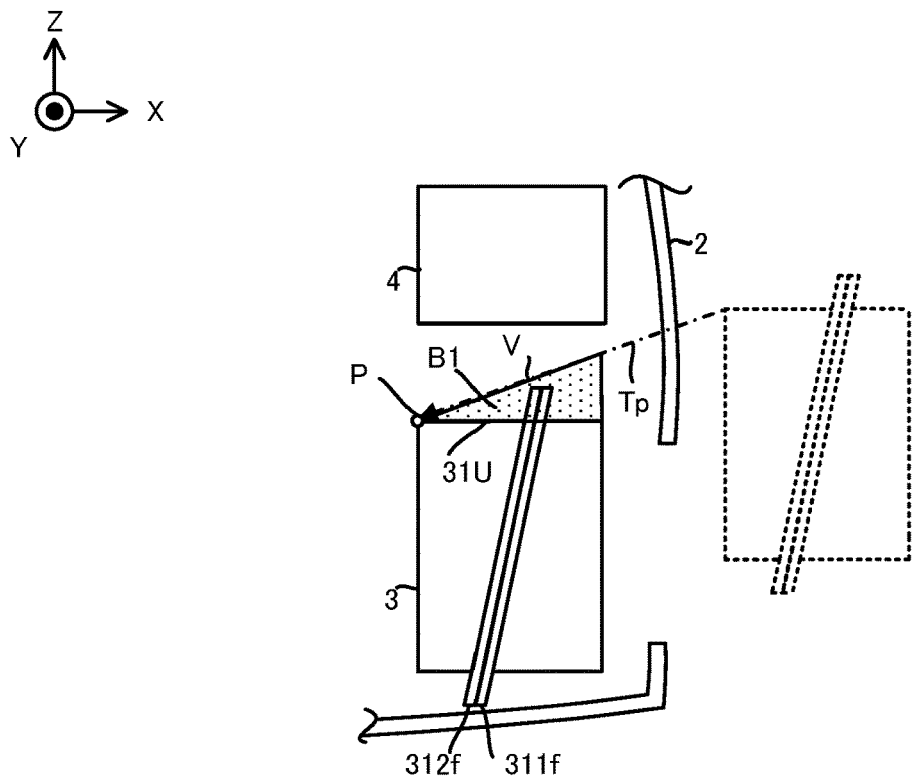

In this case, a part (an upper-front edge part P of the LIDAR 3 in an example illustrated in FIG. 7(a) and FIG. 7(b)) of the LIDAR 3 that is moved to be closest to the bumper reinforce 4 is moved along a trajectory Tp (specifically, a trajectory that passes through a start position of the upper-front edge part P and that is parallel to the trajectory T) that is illustrated in FIG. 7(a) and FIG. 7(b). This trajectory Tp does not pass through (in other words, intersect with) the bumper reinforce 4 in order to prevent the LIDAR 3 from contacting with the bumper reinforce 4 when the rear bumper 2 is attached to the vehicle 1. Namely, the upper-front edge part P does not contact with the bumper reinforce 4.

In this situation, if the upper edge part of each of the flange 311f and the flange 312f passes through an area A (see FIG. 7(a)) that is nearer the bumper reinforce 4 than the trajectory Tp is, there is a possibility that at least one of the flange 311f and the flange 312f contacts with the bumper reinforce 4 when the LIDAR 3 is attached to the vehicle 1. On the other hand, if the upper edge part of each of the flange 311f and the flange 312f passes through an area B (see FIG. 7(b)) that is more distant from the bumper reinforce 4 than the trajectory Tp is, there is no possibility that each of the flange 311f and the flange 312f contacts with the bumper reinforce 4 when the LIDAR 3 is attached to the vehicle 1.

In the present embodiment, since each of the flange 311f and the flange 312f is inclined with respect to the upper surface 31U of the housing 31, there is higher possibility that each of the flange 311f and the flange 312f passes through the area B in FIG. 7(a), compared to the comparison example in which each of the flange 311f and the flange 312f is not inclined with respect to the upper surface 31U. Therefore, in the present embodiment, there is less possibility that each of the flange 311f and the flange 312f contacts with the bumper reinforce 4 when the LIDAR 3 is attached to the vehicle 1, compared to the comparison example. In other words, it is preferable that each of the flange 311f and the flange 312f be inclined so that each of the flange 311f and the flange 312f is in an area B1 (a hatched area in FIG. 7(b)) that is defined based on the housing 31 as an area that passes through the area B1 when the LIDAR 3 is attached to the vehicle 1, in order to prevent each of the flange 311f and the flange 312f from contacting with the bumper reinforce 4.

Note that the area B1 is an area that is more upper than the upper surface 31U of the housing 31 and that is lower than a trajectory along which the part of the LIDAR 3 that is moved to be closest to the bumper reinforce 4 (however, this part is other than the flange 311f and the flange 312f, and this part is the upper-front edge part P of the housing 31) is moved. In other words, the area B1 is an area that is more upper than the upper surface 31U of the housing 31 and that is lower than a virtual surface V, wherein the virtual surface V extends rearward from the part (the upper-front edge part P) of the LIDAR 3 that is moved to be closest to the bumper reinforce 4 and the virtual surface V is parallel to the trajectory T.

(4-2) Another Modified Example

In the above described description, the vehicle 1 has the LIDAR 3. However, the vehicle 1 may have a surrounding circumstance monitoring apparatus the type of which is different from the type of the LIDAR 3, instead of or in addition to the LIDAR 3. Even in this case, it is preferable that a monitoring unit (namely, a unit that is configured to monitor the surrounding circumstance of the vehicle 1, and a unit having the above described optical system and the control circuit, for example) of the different type of the surrounding circumstance monitoring apparatus be housed in the above described housing 31. As a result, even in the case where the vehicle 1 has the surrounding circumstance monitoring apparatus the type of which is different from the type of the LIDAR 3, the above described technical effect can be achieved. Note that at least one of a radar, a camera and an ultrasonic sound sonar is one example of the surrounding circumstance monitoring apparatus the type of which is different from the type of the LIDAR 3.

The above described description uses an example in which the LIDAR 3 is fixed to the inside of the rear bumper 2. However, as illustrated in FIG. 8 and FIG. 9, the LIDAR 3 (alternatively, the different type of the surrounding circumstance monitoring apparatus) may be fixed to an inside (namely, a back side or a rear part) of a front bumper 5 that is located at a front part of the vehicle 1. In this case, the LIDAR 3 is configured to emit the detection light L1 frontward from the vehicle 1 via an optical window 5w that is formed at the front bumper 5 and to receive the reflected light L2 that is generated by the detection light L1 being reflected by an object that is located in front of the vehicle 1. Even in this case, the above described technical effect can be achieved. Incidentally, in this case, it is preferable that each of the flange 311f and the flange 312f be inclined so that each of the flange 311f and the flange 312f is distant from a front member 5a of the front bumper 5 more as each of the flange 311f and the flange 312f is located downwardly more, in order to allow the shape of a lower part 5b to be a shape that allows the adverse effect on the aerodynamics performance to become relatively smaller, wherein the front member 5a is one portion of the front bumper 5, the front member 5a is in front of the LIDAR 3, the lower part 5b is one portion of the front bumper 5 and the lower part 5b is below the LIDAR 3.

In the above described description, whole of the flange 311f is inclined with respect to at least one of the upper surface 31U and the lower surface 31L of the housing 31. Namely, in the above described description, each of the flange part 311f1, the flange part 311f2, the flange part 311f4 and the flange part 311f5 is inclined with respect to at least one of the upper surface 31U and the lower surface 31L of the housing 31. However, one portion of the flange 311f may be inclined with respect to at least one of the upper surface 31U and the lower surface 31L of the housing 31 and another portion of the flange 311f may not be inclined with respect to at least one of the upper surface 31U and the lower surface 31L of the housing 31. For example, as illustrated in FIG. 10, the flange part 311f1 that protrudes from the upper surface 31U may be inclined with respect to the upper surface 31U, the flange part 311f2 that protrudes from the lower surface 31L may be inclined with respect to the lower surface 31L and each of the flange part 311f4 and the flange part 311f5 may not be inclined with respect to at least one of the upper surface 31U and the lower surface 31L. As long as the flange part 311f1 that protrudes from the upper surface 31U is inclined with respect to the upper surface 31U and the flange part 311f2 that protrudes from the lower surface 31L is inclined with respect to the lower surface 31L, the above described technical effect can be achieved. The same true for the flange 312f. Namely, one portion of the flange 312f may be inclined with respect to at least one of the upper surface 31U and the lower surface 31L and another portion of the flange 312f may not be inclined with respect to at least one of the upper surface 31U and the lower surface 31L.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2017-015232, filed on Jan. 31, 2017, the entire contents of which are incorporated herein by reference. In addition, the entire contents of the above described Patent Literature 1 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A surrounding circumstance monitoring apparatus, which involve such changes, are also intended to be within the technical scope of the present invention.

REFERENCE SIGNS LIST 1 vehicle
2 rear bumper
2a rear member
2b lower member
2w optical window
3, 300 LIDAR
31 housing
31w optical window
31U upper surface
31L lower surface
31s housing space
311 rear housing part
311f flange
311f1, 311f2, 311f4, 311f5 flange part
311s housing space
311p bonded surface
311h aperture
311U upper surface
311L lower surface
3111 upper wall
3112 rear wall
3113 front wall
3114 left wall
3115 right wall
312 front housing part
312f flange
312f1, 312f2, 312f4, 312f5 flange part
312s housing space
312p bonded surface
312h aperture
312U upper surface
312L lower surface
3121 upper wall
3122 rear wall
3123 front wall
3124 left wall
3125 right wall
32 optical unit
4 bumper reinforce
5 front bumper
5a front member
5b lower member
5w optical window
L1 detection light
L2 reflected light

The invention claimed is:

1. A surrounding circumstance monitoring apparatus comprising:
  a housing that is configured to form a housing space therein; and
  a monitoring unit that is housed in the housing space and that is configured to monitor a surrounding circumstance of a vehicle,
  the housing having two housing parts that are bonded to each other via flanges to form the housing space therein, the flanges being formed at each of the two housing parts, respectively, so as to protrude outwardly from the housing,
  a first flange part that is one portion of the flanges and that protrudes upwardly from an upper surface of the housing and inclined with respect to the upper surface and/or a second flange part that is one portion of the flanges and that protrudes downwardly from a bottom surface of the housing and inclined with respect to the bottom surface, wherein
  the housing is configured to be fixed to an inside of an exterior member located at a front part of the vehicle,
  the second flange part is inclined away from a front member of the exterior member so that a distance between the second flange part and the front member increases in a direction toward a bottom of the second flange part, wherein the front member is located at a front side of the vehicle.

2. The surrounding circumstance monitoring apparatus according to claim 1, wherein
  at least one portion of the first flange part and the second flange part is inclined with respect to a vertical direction of the vehicle.

3. A surrounding circumstance monitoring apparatus comprising:
  a housing that is configured to form a housing space therein; and
  a monitoring unit that is housed in the housing space and that is configured to monitor a surrounding circumstance of a vehicle, the housing having two housing parts that are bonded to each other via flanges to form the housing space therein, the flanges being formed at each of the two housing parts, respectively, so as to protrude outwardly from the housing, a first flange part that is one portion of the flanges and that protrudes upwardly from an upper surface of the housing and inclined with respect to the upper surface and/or a second flange part that is one portion of the flanges and that protrudes downwardly from a bottom surface of the housing and inclined with respect to the bottom surface, wherein the housing is configured to be fixed to an inside of an exterior member that is located at a rear part of the vehicle, the second flange part is inclined away from a rear member of the exterior member so that a distance between the second flange part and the rear member increases in a direction toward a bottom of the flange part, wherein the rear member is located at a rear side of the vehicle.

4. The surrounding circumstance monitoring apparatus according to claim 3, wherein at least one portion of the first flange part and the second flange part is inclined with respect to a vertical direction of the vehicle.

* * * * *